June 17, 1952 G. D. BROCK 2,600,472
ELECTRICALLY HEATED IMPLEMENT
Filed June 21, 1947 2 SHEETS—SHEET 2
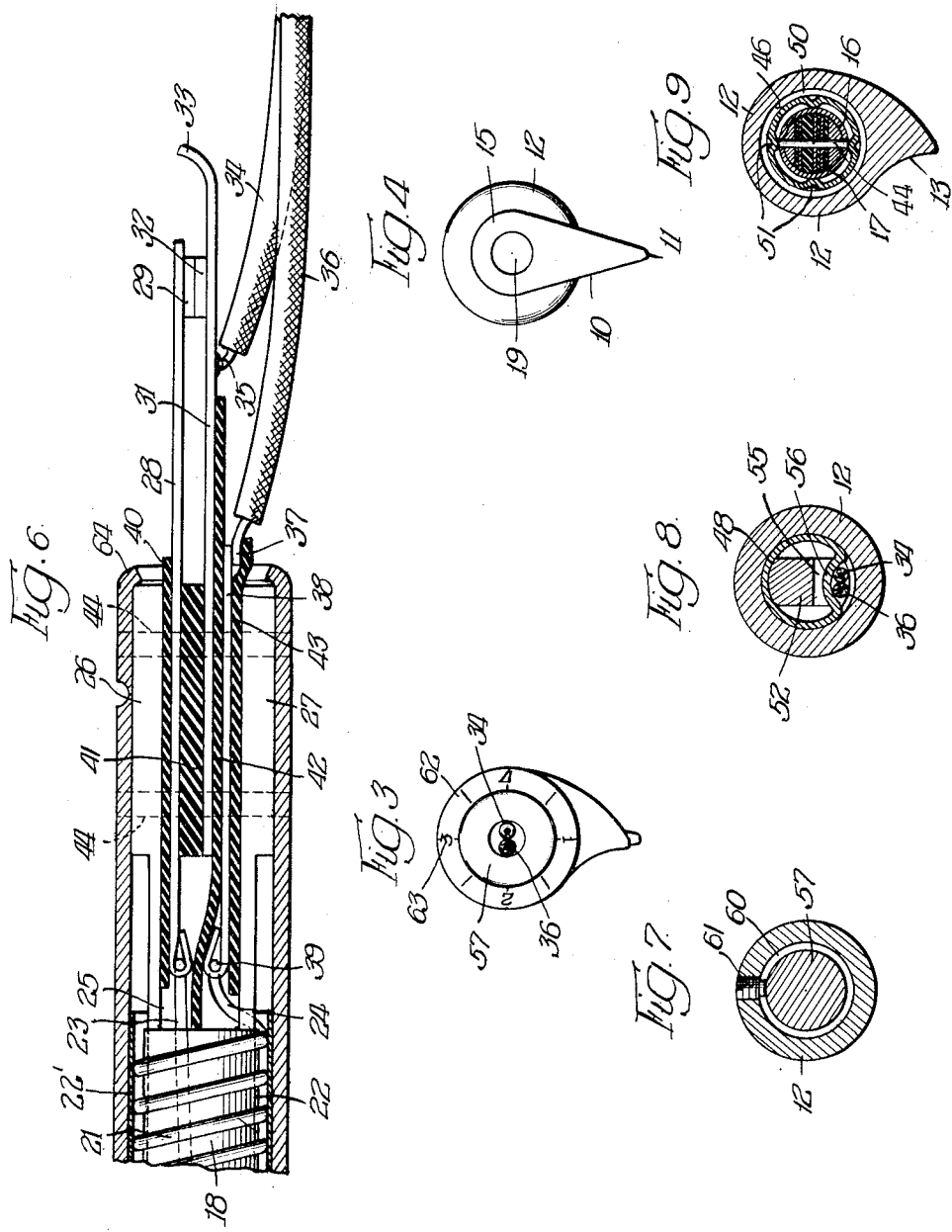
INVENTOR.
George D. Brock,
BY
Cromwell, Greist + Warden
ATTYS Patented June 17, 1952

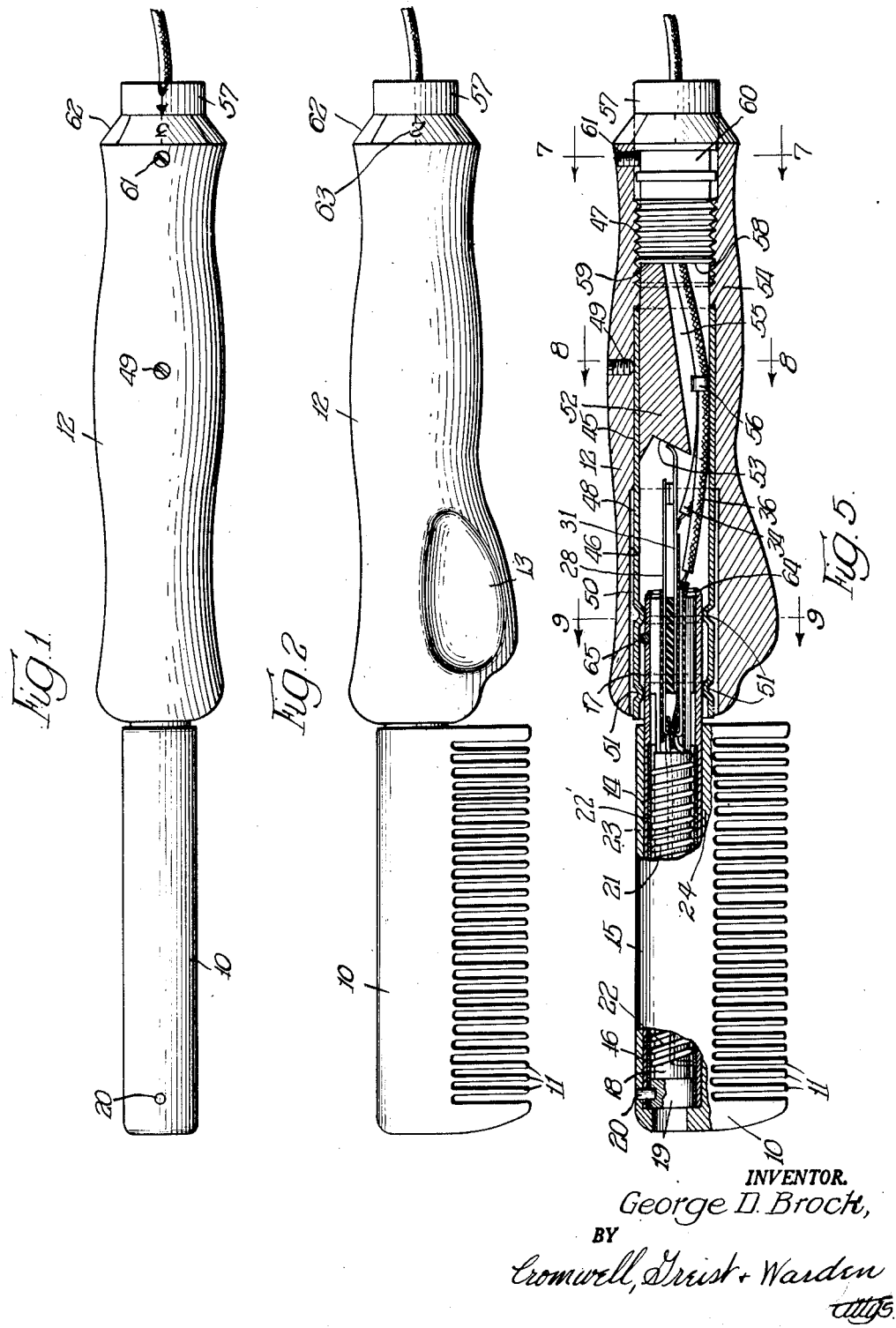

2,600,472

UNITED STATES PATENT OFFICE 2,600,472

ELECTRICALLY HEATED IMPLEMENT

George D. Brock, Chicago, Ill.

Application June 21, 1947, Serial No. 756,118

6 Claims. (Cl. 219—21)

This invention is concerned with improvements in an electrically heated implement for use by hair dressers or the like.

It is an object of the invention to provide an electrically heated hair treating implement, such as a comb, having a handle and adjustable thermostatic control mechanism arranged within the handle.

It is a further object of the invention to provide a hair treating implement having a handle and an electrical heating element wherein the heating element includes portions extending into the handle and wherein bimetallic control means is arranged between the extending portions of the heating element and an adjusting mechanism is provided whereby the control means may be set to operate at a predetermined temperature and thus provide for the maintenance of a uniform temperature in the implement.

It is another object of the invention to provide a hair treating implement comprising a comb and a handle wherein electrically heated elements in the comb have portions extending into the handle and wherein a settable thermostatic control device is positioned in the handle between extending portions of the heating elements.

It is another object of the invention to provide, in a hair treating implement having a handle attached to one side thereof and having a heating element provided with portions extending into the handle, means for attaching the handle to the element whereby excessive heating of the handle is avoided.

These and other objects of the invention will be apparent from a consideration of the preferred form of the device which is illustrated in the accompanying drawings, wherein:

Fig. 1 is an elevation of an electrically heated comb embodying the principles of the invention;

Fig. 2 is a side elevation of the comb;

Fig. 3 is an end elevation of the handle portion of the comb;

Fig. 4 is an end elevation of the tooth portion of the comb;

Fig. 5 is a partial longitudinal section through the comb and handle;

Fig. 6 is a detail view to a greatly enlarged scale of the thermostatic control mechanism;

Fig. 7 is a section on the line 7—7 of Fig. 5;

Fig. 8 is a section on the line 8—8 of Fig. 5; and

Fig. 9 is a section on the line 9—9 of Fig 5.

For convenience in description, the invention is illustrated as embodied in an electrically heated comb. However, the principles of the invention are applicable to other hair treating implements such as marcelling irons or the like.

The illustrated form of the implement comprises a comb member 10 having a plurality of teeth 11 which are tapered or wedge shaped as shown in Fig. 4. A handle 12 of non-heat conducting material, such as Bakelite, is connected to one end of the comb 10 and includes a laterally projecting portion 13 for accommodating a finger of the user to prevent the handle from turning in the hand when in use.

The comb 10 is formed of a high heat conducting metal such as bronze or aluminum and is provided with a bore 14 along the base portion 15. A sleeve or tube 16 of good heat conducting material is fitted into the bore and has a laterally extending portion 17 projecting into the handle 12.

The tube 16 encloses an electrically heated mechanism which includes a core 18. The outer end 19 of the core 18 is secured to the sleeve 16 and to the comb portion 15 by a pin 20. The core 18 extends the length of the portion 15 of the comb 10 and is provided with a reduced central portion, of slightly smaller diameter, which receives a coil of wire 21. The wire coil 21 is preferably a nickel chrome alloy which is heat producing upon the passage of an electrical current therethrough. The wire 21 is insulated from the core 18 by an insulating sleeve 22 of mica or the like and is surrounded by a similar sleeve 22' which insulates it from the tube 16. Wire coil 21 may be formed of glass covered wire or the like and the mica insulators may then be omitted. The coil ends 23 and 24 project into a recess 25 in the core 18 which is formed adjacent the handle end of the comb 10. The core 18 is provided with projecting portions 26 and 27 which extend into the end of the handle 12.

The extending portions 26 and 27 of the core 18 receive between them a bimetallic switch comprising the strip member 28 which is formed of plates of metal having different coefficients of expansion and which is provided at its free end with a contact button or element 29. The other end of the bimetallic strip member 28 is connected to the end 23 of the heating coil by folding back the end of the member 28 over the end of the coil wire and securing the same. A cooperating spring contact strip 31 is provided with a contact button 32 adjacent its free end and with a rounded or upturned projecting end portion 33. The end of one current supply wire 34 is secured to the strip 31 at 35. The end of the other current supply wire 36 is secured at 37 to one end of a strip member 38 having its other end 39 turned back over and secured to the end 24 of the heating coil 21. The member 28 is insulated from the extending portion 26 of the core 18 by an insulator strip member 40. An insulating spacer member 41 separates members 28 and 31. The spring contact strip 31 is separated from the strip member 38 by an insulator strip member 42, which extends into the recess 25 and separates the coil wire ends 23 and 24. The strip member 38 is separated from the extending portion 27 of the core 18 by an insulator strip member 43. The extending core portions 26, 27, the insulators 40, 41, 42 and 43 and the switch members 28, 31 and 38 are tied together by pins 44 extending through apertures provided in the members.

The handle 12 is provided with an axial bore 45 having an enlarged portion 46 at the comb end and a threaded portion 47 at the free end. A metal tube or sleeve 48 is secured in the bore 45 by a screw 49. The comb end portion of the sleeve 48 is separated from the body of the handle 12 by the air space 50. The laterally extending portion 17 of the sleeve 16 projects into the end of the sleeve 48 and is positioned in spaced relation therein by engagement with a series of inwardly projecting detents 51.

An axially movable block 52 is positioned in the bore 45 of the handle 12 with a sloping inner end or cam face 53 engaging the rounded end 33 of the switch member 31. A shoulder 54 provided in the handle 12 limits the movement of the block 52 in the outward direction. The block 52 is provided with a longitudinal recess 55 which accommodates the wires 34 and 36. A punched lug formation 56 in the tube 48 retains the wires 34 and 36 in position.

At the outer end of the handle 12 an adjusting cylinder 57 is in threaded engagement in the bore 47 in the handle. The inner end 58 of the cylinder 57 engages the outer end 59 of the block 52. The cylinder 57 is provided with a groove 60 into which there projects the end of a set screw 61 of somewhat less diameter than the length of the groove 60. This permits rotation of the cylinder 57 to move it axially of the handle a predetermined distance. The handle 12 is provided with a beveled edge 62 on the outer end which may be provided with indicia 63. The projecting end of cylinder 57 is preferably provided with a knurled or corrugated surface to facilitate rotation of the same.

When the current supply wires 34 and 36 are connected to an electrical supply source, current is transmitted through the switch members 28, 31 and 38 and through the heating coil 21. When the heating coil reaches a predetermined temperature the bimetallic switch member 28 will operate to separate the contact buttons 29 and 32 and cut off the current in the heating coil 21. When the temperature falls sufficiently to allow the bimetallic member to cool and resume its original position the contact buttons 29 and 32 will be brought together to renew the flow of current.

Adjustment of the temperature at which the current will be cut off by operation of the bimetallic member 28, is obtained by movement of the block 52. Engagement of cam surface 53 with the end 33 of the spring contact member 31 provides for movement of the member 31 and the contact button 32 upwardly when the block 52 is moved inwardly. Movement of the block 52 is controlled by rotation of the adjusting cylinder 57. In this manner the bimetallic switch may be set or adjusted to operate at a predetermined temperature. The contact members 29 and 32 may be initially separated so that in the fully retracted position of block 52 no current will flow through the switch. A substantial range of adjustment may be provided for by a relatively small movement of the block 52.

The portions 26 and 27 of core 18 which extend into the handle 12 insure that the bimetallic switch members will respond rapidly to changes in temperature in the core 18.

The telescoping portions of tubes 16 and 48 are spaced from each other by the detents 51. The air space 50 separates the end portion of the tube 48 from the handle 12. This construction eliminates excessive heating of the handle 12. The end of extending portion 17 of tube 16 is preferably turned in at 64 to hold the core portions 26 and 27 and the switch elements in position. The heating and switch elements may be assembled in the tube 16 as a unit and then secured in the bore 14 by the pin 20.

The tubes 16 and 48 are secured to each other by a pin 65 which extends through portion 17 of tube 16 and tube 48. In assembling the device the tube 48 is first secured to the tube 16 by the cross pin 65 and then positioned in the handle 12 and secured by set screw 49.

While specific details of construction and materials have been referred to, it will be understood that other details of construction and other materials may be resorted to within the spirit of the invention.

I claim:

1. In an electrically heated hair treating device comprising a hair engaging element having an electrically operated heating means therein which includes a heat transmitting core member provided with portions extending at one side of said hair engaging element, the improvement which comprises a handle member enclosing the extending portions of said core member, a bimetallic switch element and a cooperating spring contact element arranged between the extending portions of said core member, a horizontally movable cam member in said handle, said cam member being adapted to engage said spring contact element, a rotatable adjusting member in the outer end of said handle, the inner end of said adjusting member being adapted to engage the end of said cam member whereby rotation of said adjusting member controls the movement of said cam member.

2. A hair treating tool comprising a comb, said comb having an axially extending bore, a tubular member secured in said bore, said tubular member having a portion extending from said comb, a handle for said comb having an axially extending bore, said bore being provided with an enlarged portion at one end, a tubular member secured in said handle with an end extending in spaced relation into the enlarged portion of the bore therein, inwardly extending projections on said tubular member in said handle, said projections engaging the extending portion of the tubular member in said comb for securing said tubular members in spaced relation, an electrical heating device in said comb, and an adjustable temperature responsive control means for said heating device including portions extending from said first mentioned tubular member into said bore in said handle.

3. A hair treating tool comprising a comb, said comb having an axially extending bore, a tubular member secured in said bore, said tubular member having a portion extending from said comb, a handle for said comb having an axially extending bore, said bore being provided with an enlarged portion at one end, a tubular member secured in said handle with an end extending into the enlarged portion of the bore therein, the extending portion of the tubular member in said comb engaging in telescoping relation with the end of the tubular member in said handle, separable means connecting said telescoping portions of said tubular members in spaced relation to separably connect said handle to said comb, an electrical heating device in said comb, and an adjustable temperature responsive control means for said heating device including portions extending from said first mentioned tubular member into said bore in said handle.

4. A hair treating tool comprising a hair engaging element having an axially extending recess, an electric heating unit arranged in said recess, said heating unit having a portion extending from said element, a handle for said element having an axially extending internal recess forming member, said handle being secured in encompassing relation to the extending portion of said heating unit, said recess forming member being provided with internal means engaging the extending portion of said heating unit with said extending portion in spaced relation to said recess forming member, and an adjustable temperature responsive control means for said heating unit including portions arranged in said recess forming member and projecting into the extending portion of said heating unit.

5. A handle construction for an electrically heated hair treating device characterized by a hair engaging member provided with a recess for receiving an electric heating element, said handle being formed of heat insulating material and having an axial bore provided with an enlarged section at one end thereof, a tubular member of heat transmitting material in said bore having a portion extending into said enlarged bore section in spaced relation to the internal walls thereof, a second tubular member of heat transmitting material having one end separably secured in spaced relation in said first mentioned tubular member and having the other end adapted to extend into the recess in said hair engaging member, said last mentioned tubular member supporting an electric heating element including a core member having portions projecting into said handle, said projecting portions of said core member supporting a bimetallic switch element and a cooperating spring mounted contact switch element, an axially slidable cam member in said handle engageable with said spring mounted contact element to adjust said contact element toward and from said bimetallic element and a rotatable screw adjusting member in the other end of said handle adjustably engaging said cam member.

6. A hair treating tool comprising a comb, said comb having an axially extending bore, a tubular member secured in said bore, said tubular member having a portion extending from said comb, a handle for said comb having an axially extending bore, said bore being provided with an enlarger portion at the comb end, a second tubular member in said handle having a portion extending in spaced relation into the enlarged portion of said bore, radially inwardly extending means on said first mentioned tubular member in said handle for securing said tubular member in spaced relation to the extending portion of the tubular member in said comb, an electrical heating device in the tube in said comb, and temperature responsive switch means connected with said heating device and extending into the tubular member in said handle for controlling the current supplied to said heating device in said handle.

GEORGE D. BROCK.

REFERENCES CITED

The following references are of record in the file of this patent:

UNITED STATES PATENTS

| Number | Name | Date |
|---|---|---|
| 1,033,122 | Schwartz | July 23, 1912 |
| 1,597,241 | Marsden | Aug. 24, 1926 |
| 1,772,002 | Harper | Aug. 5, 1930 |
| 1,857,906 | Wolcott et al. | May 10, 1932 |
| 2,012,490 | Wright | Aug. 27, 1935 |
| 2,214,084 | Lovice | Sept. 10, 1940 |
| 2,224,583 | Abbott | Dec. 10, 1940 |
| 2,260,030 | Hurst | Oct. 21, 1941 |
| 2,341,831 | Vanatta | Feb. 15, 1944 |
| 2,457,621 | Aeres | Dec. 28, 1948 |